United States Patent
Bouaouaja et al.

(10) Patent No.: US 10,248,743 B2
(45) Date of Patent: Apr. 2, 2019

(54) DETERMINING CUMULATIVE WATER FLOW ON A GRID-BY-GRID BASIS IN A GEOCELLULAR EARTH MODEL

(71) Applicant: Saudi Arabian Oil Company, Dhahran (SA)

(72) Inventors: Mohamed Bouaouaja, Al Khobar (SA); Ahmed Alhuthali, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 402 days.

(21) Appl. No.: 15/180,832

(22) Filed: Jun. 13, 2016

(65) Prior Publication Data

US 2017/0357739 A1    Dec. 14, 2017

(51) Int. Cl.

| | |
|---|---|
| *G06F 17/50* | (2006.01) |
| *G01V 99/00* | (2009.01) |
| *G06F 17/11* | (2006.01) |
| *E21B 43/00* | (2006.01) |

(52) U.S. Cl.
CPC .......... *G06F 17/5009* (2013.01); *E21B 43/00* (2013.01); *G01V 99/005* (2013.01); *G06F 17/11* (2013.01); *G06F 17/50* (2013.01); *G06F 2217/16* (2013.01)

(58) Field of Classification Search
CPC .............................. G06F 2217/16; G06F 17/50
USPC ........................................................ 703/9, 6
See application file for complete search history.

(56) References Cited

U.S. PATENT DOCUMENTS

| | | | |
|---|---|---|---|
| 6,230,101 B1* | 5/2001 | Wallis | G06T 17/00 |
| | | | 702/14 |
| 7,603,265 B2 | 10/2009 | Mainguy et al. | |
| 7,617,083 B2 | 11/2009 | Bennis et al. | |
| 8,275,593 B2 | 9/2012 | Zhao | |
| 8,359,163 B2 | 1/2013 | Bowen | |
| 8,949,096 B2 | 2/2015 | Joliff | |
| 9,058,445 B2 | 6/2015 | Usadi et al. | |

(Continued)

FOREIGN PATENT DOCUMENTS

CN          103413346 A  * 11/2013

OTHER PUBLICATIONS

Jing Liu, Generation and Visualization of Four-Dimensional MR Angiography Data Using an Undersampled 3-D Projection Trajectory. (Year: 2006).*

(Continued)

*Primary Examiner* — Lechi Truong
(74) *Attorney, Agent, or Firm* — Fish & Richardson P.C.

(57) ABSTRACT

Four-dimensional fluid flow data is received that is associated with a time dimension and I, J, and K dimensions. The four-dimensional fluid flow data includes, for each of plural time steps, a fluid flow amount for the respective time step and for a respective I, J, K cell. Using the four-dimensional fluid flow data and for each of plural time steps, a four-dimensional geocellular model is determined having I, J, K and t dimensions and indicating, for each I, J, K, t cell, an amount of a fluid flowing through the I, J, K cell for a respective time step t. A three-dimensional time-independent model is determined for the I, J, K cell. A two-dimensional time-independent model is determined that includes a cumulative fluid flow amount for each I, J cell.

14 Claims, 6 Drawing Sheets
(3 of 6 Drawing Sheet(s) Filed in Color)

(56) References Cited

U.S. PATENT DOCUMENTS

| | | | |
|---|---|---|---|
| 2006/0257626 A1* | 11/2006 | Schlesser | C30B 25/02 |
| | | | 428/141 |
| 2010/0312535 A1 | 12/2010 | Chen et al. | |
| 2013/0268247 A1 | 10/2013 | Rowan et al. | |
| 2014/0005994 A1 | 1/2014 | Obrien et al. | |
| 2014/0046636 A1 | 2/2014 | Mustapha | |
| 2014/0372095 A1 | 12/2014 | van Der Zee et al. | |
| 2016/0010444 A1 | 1/2016 | AlQahtani et al. | |

OTHER PUBLICATIONS

Abdollah Orangi: "Flood Front Tracking and Continuous Recording of Time Lag in Immiscible Displacement", A Dissertation Present to the Facultiy of the Graduate School, Univ. of Southern California; Dec. 2008., 127 pages.

Abdullah I. Al-Sada et al.: "Sweet Spot Identification and Optimum Well Planning: an Integrated Workflow to Improve the Sweep in a Sector of Giant Carbonate Mature Oil Reservoir"; Society of Petroleum Engineers, 2014, 10 pages.

Subsurface Maps—from AAPG Wiki; http://wiki.aapg.org/Subsurface_maps; retrieved on May 19, 2016, 8 pages.

Luca Consentino:"Integrated Reservoir Studies"; Editions TECHNIP, Institut Francais du Petrole Publications; 2001, 7 pages.

Choon et al., "Identification of Bypassed Oil for Developemnt in Mature Water-Driven Reservoirs," Asia Pacific Oil and Gas Conference and Exhibition, Jan. 1, 20017; pp. 1-13.

da Cruz et al., "The Quality Map: A Tool for Reservoir Uncertainty Quantification and Decision Making," SPE Reservoir Evaluation and Engineering, Jan. 1, 2004; pp. 6-14.

International Search Report and Written Opinion of the International Searching Authority issued in International Application No. PCT/US2017/035238 dated Sep. 6, 2017; 14 pages.

* cited by examiner

DETERMINING CUMULATIVE WATER FLOW ON A GRID-BY-GRID BASIS IN A GEOCELLULAR EARTH MODEL

BACKGROUND

The present disclosure relates to determining cumulative fluid flow in an earth model.

The oil industry and potentially other industries can benefit from information associated with underground conditions. For example, if an oil company is planning to drill a new oil well in an area, it can be beneficial to know of existing underground conditions, including the composition (for example, water, oil, gas) of particular areas and whether changes are occurring over time.

SUMMARY

The disclosure describes computer-implemented methods, software, and systems for determining cumulative water flow on a grid-by-grid basis of a geocellular earth model. Four-dimensional fluid flow data is received that is associated with a time dimension and I, J, and K dimensions. The four-dimensional fluid flow data includes, for each time step of plural time steps associated with the time step dimension, a fluid flow amount for the respective time step and for a respective I, J, K cell. Using the four-dimensional fluid flow data and for each of plural time steps t, a four-dimensional geocellular model is determined having I, J, K and t dimensions and indicating, for each I, J, K, t cell, a fluid flow amount of a fluid flowing through the I, J, K cell for a respective time step t. Using plural four-dimensional geocellular models, each associated with one of the plural time steps, a three-dimensional time-independent model is determined for the I, J, K cell. Using the three-dimensional time-independent model, a two-dimensional time-independent model is determined that includes a cumulative fluid flow amount for each I, J cell.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, determining the three-dimensional time-independent model includes summing, for a particular I, J, K cell, the fluid flow amounts associated with the plural time steps.

In a second aspect, combinable with any of the previous aspects, determining the two-dimensional time-independent model includes combining values of the three-dimensional time-independent model along a same dimension, including summing, for a respective (I, J) cell in the two-dimensional time-independent geocellular model, cumulative fluid flow amounts for (I, J, K) cells in the three-dimensional time-independent geocellular model having different K values for a same (I, J) pair.

In a third aspect, combinable with any of the previous aspects, the determining includes assigning greater weights for time steps that are more recent.

In a fourth aspect, combinable with any of the previous aspects, the determining includes assigning greater weights for time steps that are a better match according to a match factor α over time t using:

$$\text{Cum\_Cell}_{flow} = \Sigma_t \alpha \, \text{Cell}_{flow},$$

wherein $\text{Cum\_Cell}_{flow}$ is the cumulative fluid flow amount, and wherein $\Sigma_t \alpha \, \text{Cell}_{flow}$ is a respective time step for the time t.

In a fifth aspect, combinable with any of the previous aspects, the fluid flow amount for a respective cell is determined as a function of the square root of a sum of squares of fluid flow amounts in each of the I, J, and K directions.

In a sixth aspect, combinable with any of the previous aspects, the method further comprises determining, using the two-dimensional time-independent model, a sweep status of a reservoir location represented by (I, J) indexing in the two-dimensional time-independent model.

In a seventh aspect, combinable with any of the previous aspects, determining the sweep status includes identifying a dry zone for a respective (I, J) location when a cumulative flow at the respective (I, J) location is less than predetermined threshold epsilon value ε given by:

$$\text{Cum}_{Cell_{flow}} < \varepsilon.$$

In an eighth aspect, combinable with any of the previous aspects, determining the sweep status includes identifying a totally swept zone for a respective (I, J) location when a cumulative flow at the respective (I, J) location is higher than pre-set threshold omega value ω given by:

$$\text{Cum}_{Cell_{flow}} > \omega.$$

In a ninth aspect, combinable with any of the previous aspects, the method further comprises determining, using the two-dimensional time-independent model, one or more reservoir target locations for new wells, including identifying geosteering paths optimized to substantially avoid or target areas of higher fluid flow amounts.

In a tenth aspect, combinable with any of the previous aspects, the method further comprises determining, using the two-dimensional time-independent model, one or more geosteering paths for azimuthal direction of new wells, the geosteering paths optimized to substantially avoid or target areas of higher fluid flow amounts.

In an eleventh aspect, combinable with any of the previous aspects, the method further comprises determining, using the three-dimensional time-independent model, one or more geosteering paths for inclination of new wells, the geosteering paths optimized to substantially avoid or target areas of higher fluid flow amounts.

The subject matter described in this specification can be implemented in particular implementations so as to realize one or more of the following advantages. First, techniques described herein can have various applications, for example, in diagnosing a water encroachment mechanism, determining volumetric sweep efficiency, and supporting reservoir management practices relevant to waterflooding. Second, the techniques can have direct implications for improving ultimate recovery for fields that are under waterflooding.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

The patent or application file contains at least one color drawing executed in color. Copies of this patent application publication with color drawing(s) will be provided by the Patent and Trademark Office upon request and payment of the necessary fee.

Like reference numbers and designations in the various drawings indicate like elements.

DETAILED DESCRIPTION

Figure 1:
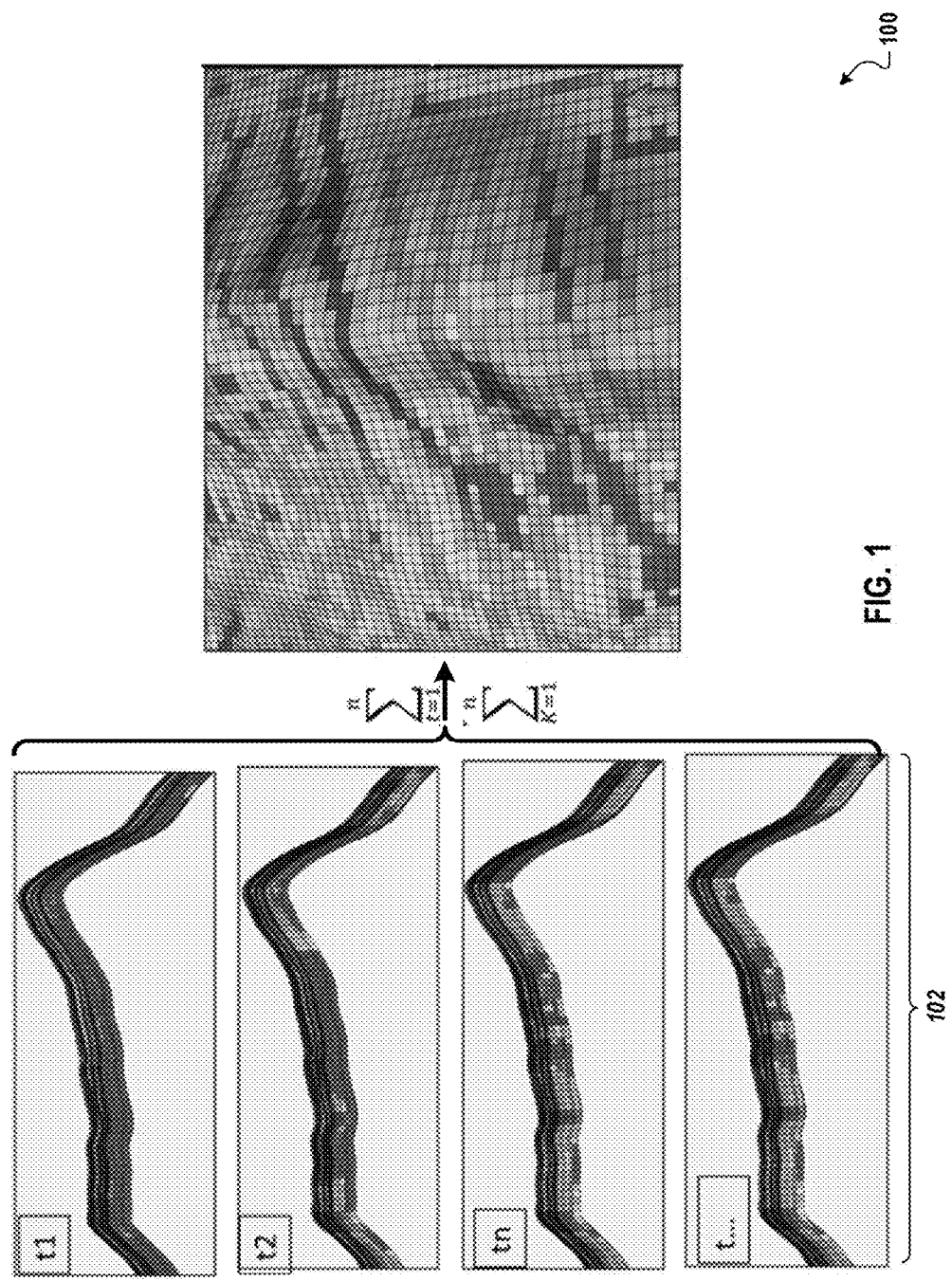
FIG. 1 is an example map showing cumulative fluxes of water crossing locations identified by each location's X, Y coordinates, according to an implementation.

The following detailed description is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Described are computer-implemented methods, software, and systems for computing a cumulative water quantity crossing a grid block, such as a cell, of geocellular earth model. The computed quantity can be used, for example, to construct a water flow map that illustrates and represents the water influxes and the consequent sweep in an oil reservoir under a waterflood secondary recovery process. The techniques can have various applications, for example, in diagnosing a water encroachment mechanism, determining volumetric sweep efficiency, and supporting reservoir management practices relevant to waterflooding. The techniques can also have direct implications for improving ultimate recovery for fields that are under waterflooding.

In geocellular earth model, for example, fluid phase flow from cell-to-cell can be calculated based on pressure differences, rock permeability, and phase relative permeability. The fluid phase can be, for example, oil, water or gas. For illustrative purposes, as well as for practical industry benefit, procedures presented herein are described with respect to water flow. However, similar procedures can be used for oil flow and gas flow.

A geocellular earth model can be discretized, for example, upon definition of three dimensions (for example, I, J, K), and the flow can be calculated in directions associated with these dimensions. If the I, J, K components of flow are known for a particular cell, for example, then a flow vector for the cell is fully known. The three dimensions can be each perpendicular to the other dimensions, such as in an X, Y, Z coordinate space. In other implementations, other coordinate systems and numbers of dimensions can be used, such as to support different Earth projections or other mappings.

Using various numerical earth model simulation conventions, the flow for a particular cell can be computed in association with a negative or a positive direction according to a pre-set axis. At any given time, using a numerical simulation of flow either entering or exiting a particular cell, a given component for each of the three conventional axes can have a positive or a negative value.

In some implementations, an amount of water, for example, an amount that crosses a cell at a particular time can be based on a relationship of the flow in each of the three dimensions. For example, no matter if water is entering or exiting the cell, the following equation can be used to identify the absolute quantity of flow:

$$\text{Cell}_{flow} = \sqrt{I_{flow}^2 + J_{flow}^2 + K_{flow}^2} \quad (1).$$

Equation (1) can be repeated for each cell in the entire geocellular earth model, as well as for each of the different time steps for each cell. As a result, a flow value can be generated for each cell of interest at each time step in a numerical simulation process.

The summation of flow over time can be used to determine a cumulative cell flow that crosses each cell. For example, the cumulative cell flow for a given cell can represent an amount of water that has passed through the faces of the cell through the entire time of the simulation. The faces, for example, can include top and side faces of a cube or other 3D rectangular block that represents the cell, or faces of some other shape that has pairs of substantially parallel faces. In some implementations, cumulative cell flow quantities can be used to differentiate with, or compare to, stored amounts in cells, including different types of fluids.

The cumulative cell flow for a given cell can be determined using the following equation:

$$\text{Cum}_{Cell_{flow}} = \Sigma_t \text{Cell}_{flow} \quad (2).$$

By determining a cumulative cell flow at a given cell, using equation (2), for example, each value associated with a 4-dimension space (I, J, K, t) can be reduced to a single value for each cell. This can produce a set of values for a 3-dimensional space (I, J, K). In this way, the time component, for example, can be neutralized for each cell through the summation process of equation (2).

A further reduction can be used to convert the 3-dimension space (I, J, K) into a 2-dimension space (I, J). For example, to achieve a dimension that reduces the 3D space to a 2D space, the (I, J, K) cumulative flow values corresponding to a common K vertical direction can be summed, such as using the following equation.

$$\text{Water}_{flow} = \Sigma_K \text{Cum\_Cell}_{flow} \quad (3).$$

Using equations (1)-(3), a 2D space can be produced, with each (I, J) cell representing a 2D map that shows a cumulative flow over time. Each (I, J) value can quantify, for example, all fluxes of water that have crossed a designated location identified by the location's (I, J) coordinates.

FIG. 1 is an example map 100 showing cumulative fluxes of water crossing locations identified by each location's X, Y coordinates, according to an implementation. For example, the map 100, as depicted, is a three-dimensional rendering of a two-dimensional area. Each cell in the map 100 represents, for example, 2D cumulative fluid flow for the location, irrespective of time steps (represented by 2D time step layers 102) and vertical location.

Figure 2:
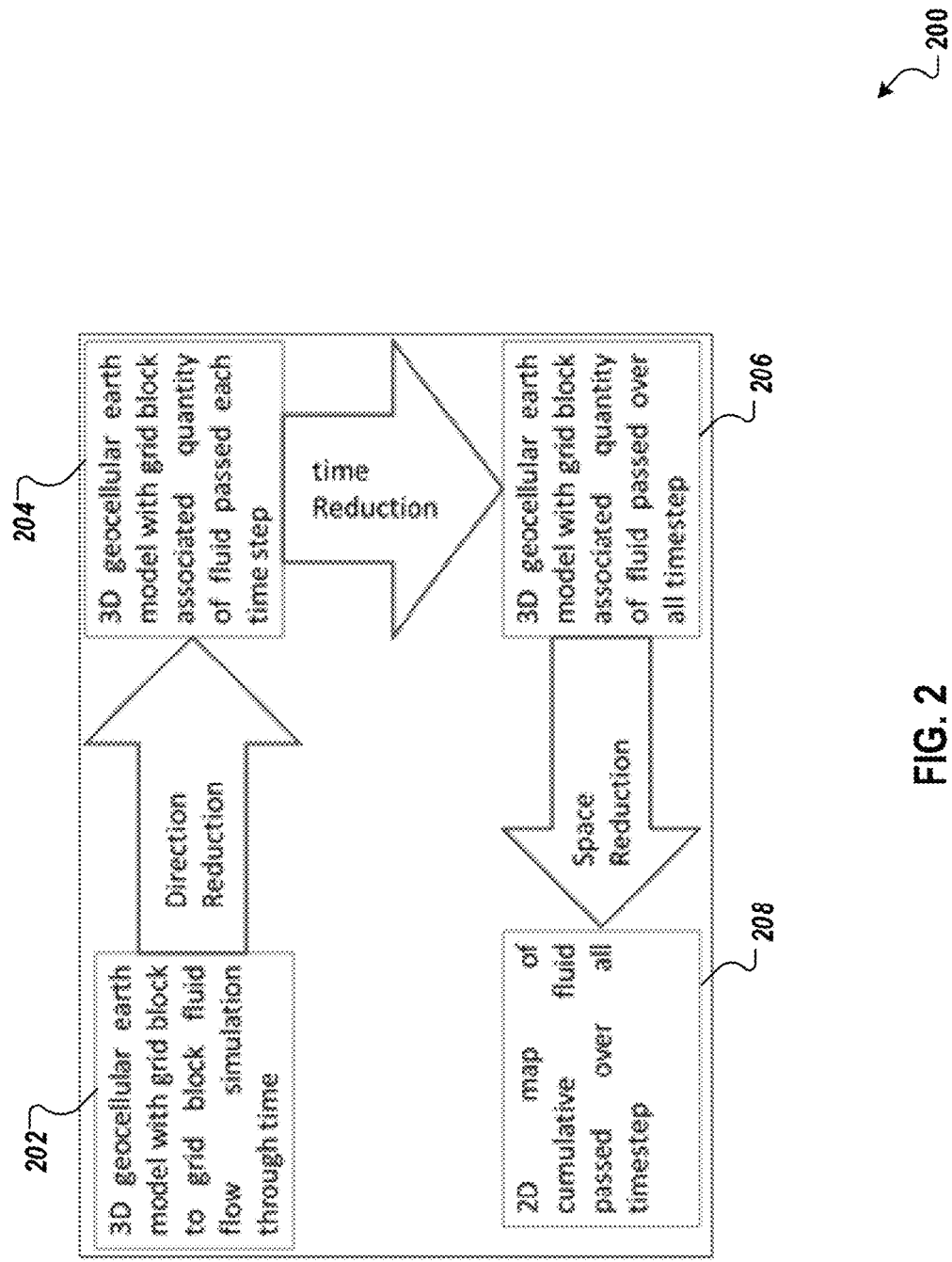
FIG. 2 is a flow diagram of an example process flow for determining fluid flow models, according to an implementation.

FIG. 2 is a flow diagram of an example process flow 200 for determining fluid flow models, according to an implementation. For example, the process flow 200 includes steps 202-208 which generally correspond to the progression of equations (1)-(3) and the method 600 of the flow diagram of FIG. 6.

Figure 3:
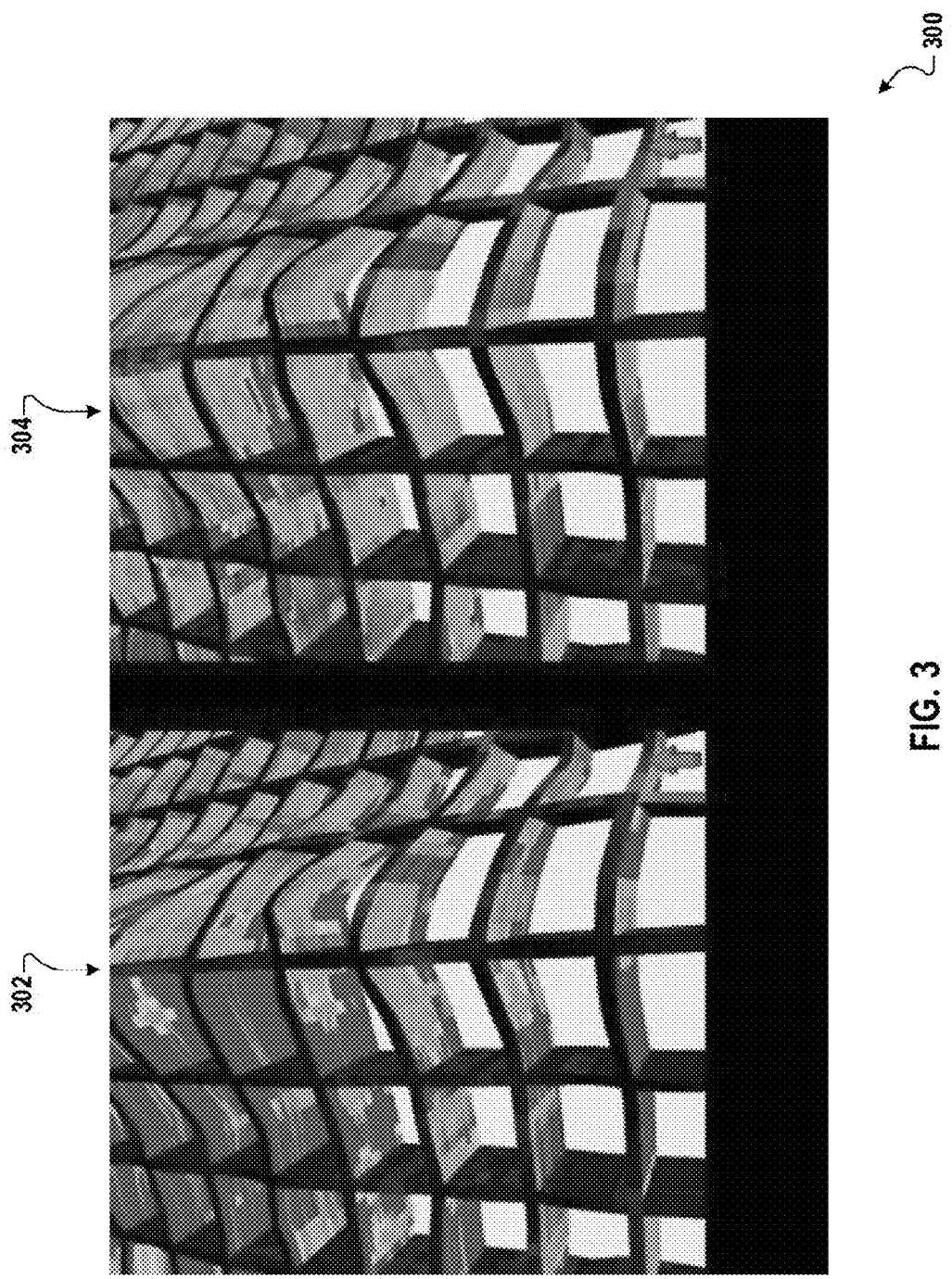
FIG. 3 is an example sequence of generated maps that can be generated using fluid flow amounts at different time steps, according to an implementation.

FIG. 3 is an example sequence 300 of generated maps 302 and 304 that can be generated using fluid flow amounts at different time steps, according to an implementation. The maps 302 and 304 can be used, for example, for decision aiding and diagnosing for well placement either for new drilling wells or to sidetrack existing wells.

Figure 4:
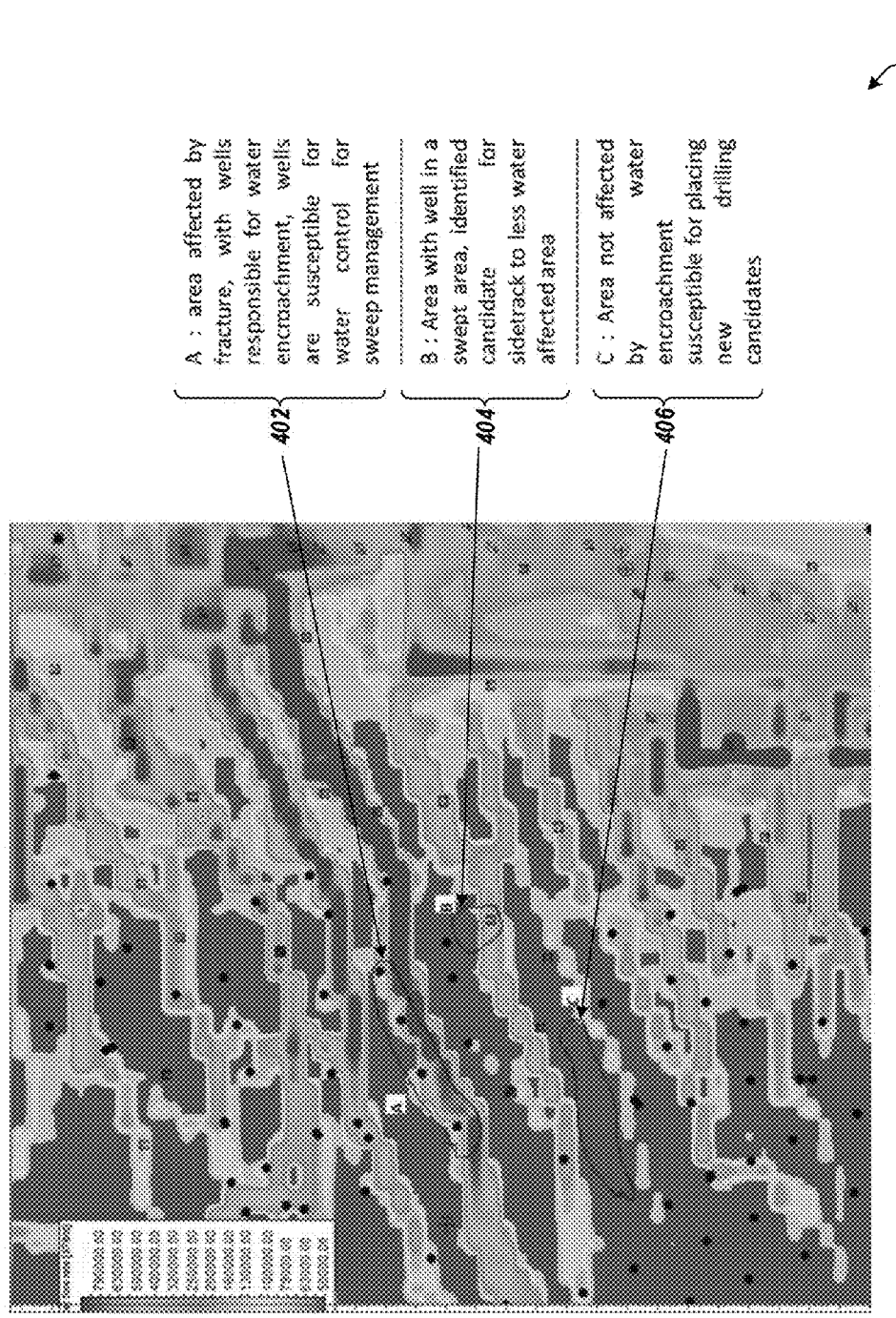
FIG. 4 shows an example decision map superimposed over a cumulative fluid flow map, according to an implementation.

FIG. 4 shows an example decision map 400 superimposed over a cumulative fluid flow map, according to an implementation. The decision map 400 shows different types of areas 402, 404 and 406 that can be identified from cumulative flow map.

Figure 5:
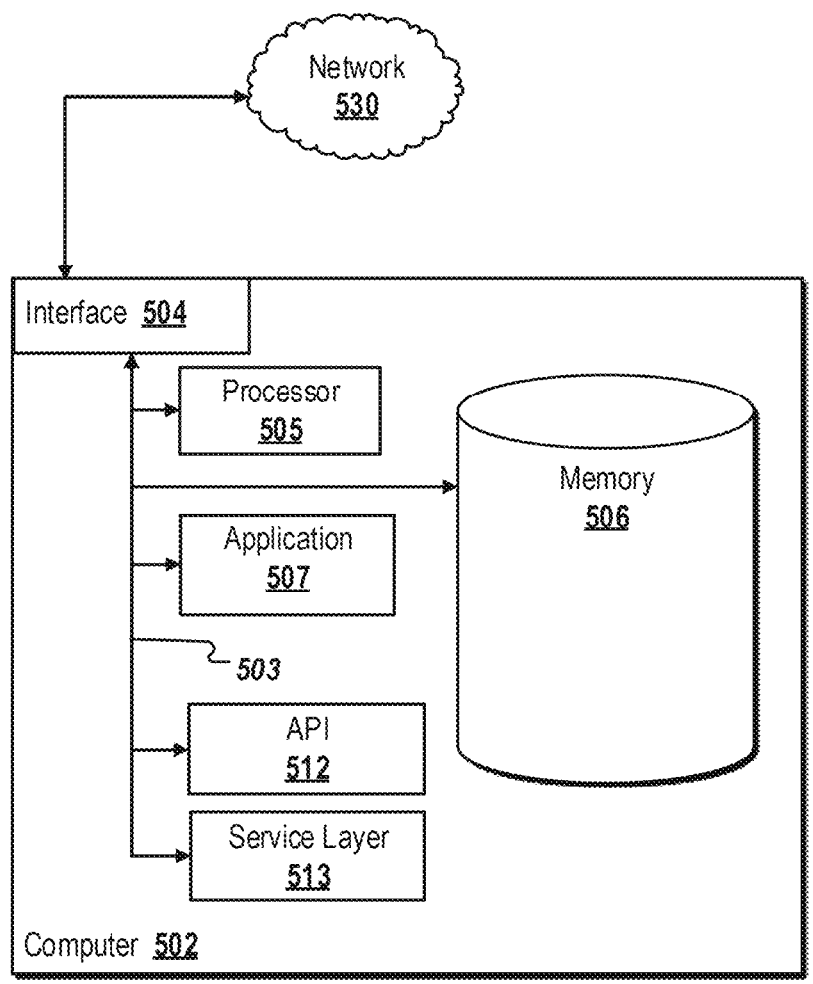
FIG. 5 is a block diagram of an exemplary computer system used to provide computational functionalities associated with described algorithms, methods, functions, processes, flows, and procedures as described in the instant disclosure, according to an implementation.

FIG. 5 is a block diagram of an exemplary computer system 500 used to provide computational functionalities associated with described algorithms, methods, functions, processes, flows, and procedures as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a GUI.

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, business intelligence (BI) server, or other server (or a combination of servers).

The computer 502 can receive requests over network 530 from a client application (for example, executing on another computer 502) and responding to the received requests by processing the said requests in an appropriate software application. In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems in a distributed environment that are connected to the network 530 (whether illustrated or not). Generally, the interface 504 comprises logic encoded in software or hardware (or a combination of software and hardware) and operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a memory 506 that holds data for the computer 502 or other components (or a combination of both) that can be connected to the network 530 (whether illustrated or not). For example, memory 506 can be a database storing data consistent with this disclosure. Although illustrated as a single memory 506 in FIG. 5, two or more memories may be used according to particular needs, desires, or particular implementations of the computer 502 and the described functionality. While memory 506 is illustrated as an integral component of the computer 502, in alternative implementations, memory 506 can be external to the computer 502.

The application 507 is an algorithmic software engine providing functionality according to particular needs, desires, or particular implementations of the computer 502, particularly with respect to functionality described in this disclosure. For example, application 507 can serve as one or more components, modules, applications, etc. Further, although illustrated as a single application 507, the application 507 may be implemented as multiple applications 507 on the computer 502. In addition, although illustrated as integral to the computer 502, in alternative implementations, the application 507 can be external to the computer 502.

There may be any number of computers 502 associated with, or external to, a computer system containing computer 502, each computer 502 communicating over network 530. Further, the term "client," "user," and other appropriate terminology may be used interchangeably as appropriate without departing from the scope of this disclosure. Moreover, this disclosure contemplates that many users may use one computer 502, or that one user may use multiple computers 502.

Figure 6:
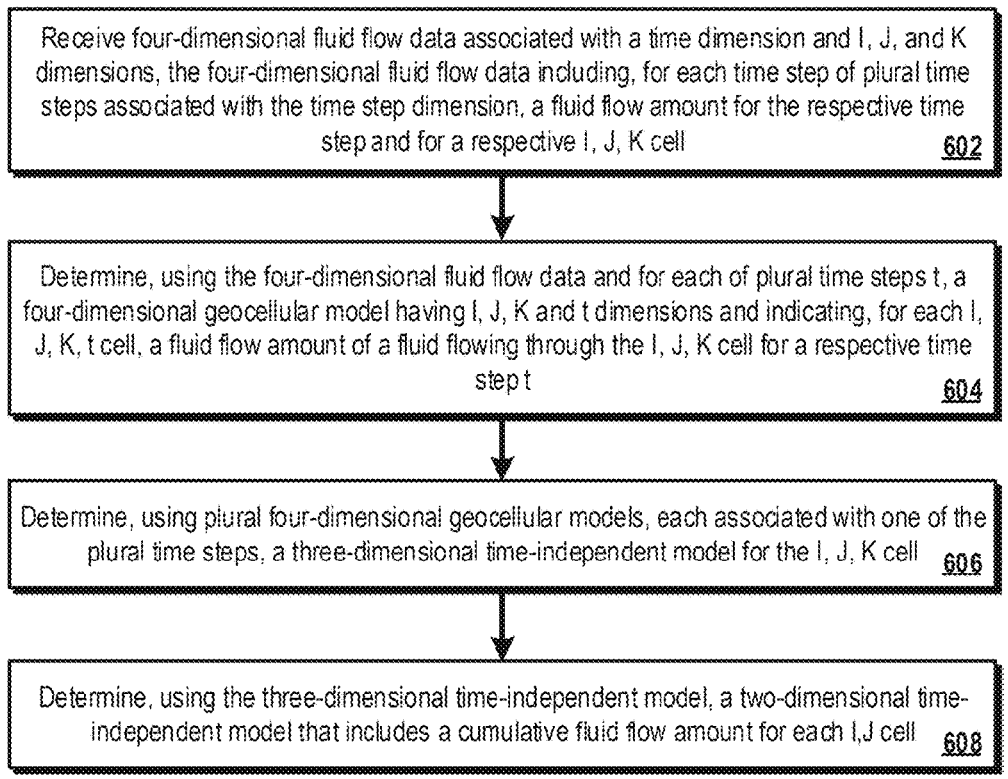
FIG. 6 is a flowchart of an example method for determining fluid flow, according to an implementation.

FIG. 6 is a flowchart of an example method 600 for determining fluid flow, according to an implementation. For clarity of presentation, the description that follows generally describes method 600 in the context of the other figures in this description. However, it will be understood that method 600 may be performed, for example, by any suitable system, environment, software, and hardware, or a combination of systems, environments, software, and hardware as appropriate. In some implementations, various steps of method 600 can be run in parallel, in combination, in loops, or in any order.

At 602, four-dimensional fluid flow data is received that is associated with a time dimension and I, J, and K dimensions, the four-dimensional fluid flow data including, for each time step of plural time steps associated with the time step dimension, a fluid flow amount for the respective time step and for a respective (I, J, K) cell. I and J, for example, can be associated with horizontal directions, such as in east-west or other perpendicular directions, and K can be associated with a vertical direction. From 602, method 600 proceeds to 604.

At 604, using the four-dimensional fluid flow data and for each of plural time steps t, a four-dimensional geocellular model is determined having I, J, K and t dimensions and indicating, for each (I, J, K, t) cell, a fluid flow amount of a fluid, such as water, oil or gas, flowing through the (I, J, K) cell for a respective time step t. In some implementations, the fluid flow amount for a respective cell can be determined as a function of the square root of a sum of squares of fluid flow amounts in each of the I, J, and K directions. For example, equation (1) can be used to determine the fluid flow amount at time t for a particular (I, J, K) cell. From 604, method 600 proceeds to 606.

At 606, using plural four-dimensional geocellular models, each associated with one of the plural time steps, a three-dimensional time-independent model is determined for the I, J, K cell. In some implementations, determining the three-dimensional time-independent model can include summing, for a particular (I, J, K) cell of the, the fluid flow amounts associated with the plural time steps, for example using equation (2). From 606, method 600 proceeds to 608.

In some implementations, the determining the three-dimensional time-independent model can include assigning greater weights for time steps that are more recent. For example, a more recent time of fluid flow can contribute, to a cumulative time-independent fluid flow amount for an (I, J, K) cell, a greater fluid flow amount than would be the case for a less recent time.

In some implementations, determining the three-dimensional time-independent model can include assigning greater weights for time steps that are a better match according to a match factor α over time t using the following equation:

$$\mathrm{Cum\_Cell}_{flow} = \Sigma_t \alpha \, \mathrm{Cell}_{flow} \quad (4),$$

where $\mathrm{Cum\_Cell}_{flow}$ is the cumulative fluid flow amount, and where $\tau_t \alpha \, \mathrm{Cell}_{flow}$ is a respective time step for the time t.

At 608, using the three-dimensional time-independent model, a two-dimensional time-independent model is determined that includes a cumulative fluid flow amount for each (I, J) cell. In some implementations, determining the two-dimensional time-independent model includes combining values of the three-dimensional time-independent model along a same dimension, including summing, for a respective (I, J) cell in the two-dimensional time-independent geocellular model, cumulative fluid flow amounts for (I, J, K) cells in the three-dimensional time-independent geocellular model having different K values for a same (I, J) pair. For example, equation (3) can be used to reduce three-dimensional models to a two-dimension model. From 608, method 600 stops.

In some implementations, the method 600 can further include determining, using the two-dimensional time-independent model, a sweep status of a reservoir location represented by (I, J) indexing in the two-dimensional time-independent model. For example, determining the sweep status can include identifying a dry zone for a respective (I, J) location when a cumulative flow at the respective (I, J) location is less than pre-determined threshold epsilon value e given by the equation:

$$\mathrm{Cum}_{Cell_{flow}} < \varepsilon \quad (5).$$

In some implementations, determining the sweep status includes identifying a totally swept zone for a respective (I, J) location when a cumulative flow at the respective (I, J) location is higher than pre-set threshold omega value ω given by:

$$\mathrm{Cum}_{Cell_{flow}} > \omega \quad (6).$$

In some implementations, the method 600 can further include determining, using the two-dimensional time-independent model, one or more reservoir target locations for new wells. For example, the reservoir target locations can be used to identify geosteering paths optimized to substantially avoid or target areas of higher fluid flow amounts, such as fluid flow amounts over a threshold or some other per-determined value.

In some implementations, the method 600 can further include determining, using the two-dimensional time-independent model, one or more geosteering paths for azimuthal direction of new wells. For example, the geosteering paths can be optimized to substantially avoid or target areas of higher fluid flow amounts.

In some implementations, the method 600 can further include determining, using the three-dimensional time-independent model, one or more geosteering paths for inclination of new wells. For example, the geosteering paths can be optimized to substantially avoid or target areas of higher fluid flow amounts.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure, all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving four-dimensional fluid flow data associated with a time dimension and I, J, and K dimensions, the four-dimensional fluid flow data including, for each time step of plural time steps associated with the time step dimension, a fluid flow amount for the respective time step and for a respective I, J, K cell;
determining, using the four-dimensional fluid flow data and for each of plural time steps t, a four-dimensional geocellular model having I, J, K and t dimensions and indicating, for each I, J, K, I cell, a fluid flow amount of a fluid flowing through the I, J, K cell for a respective time step t;
determining, using plural four-dimensional geocellular models, a three-dimensional time-independent model for the I, J, K cell, wherein determining the three-dimensional time-independent model includes summing, for a particular I, J, K cell, the fluid (low amounts from the plural time steps; and
determining, using the three-dimensional time-independent model, a two-dimensional time-independent model that includes a cumulative fluid flow amount for each I, J cell in the respective time-independent mode;
wherein the fluid flow amount for a respective cell is determined as a function of the square root of a sum of squares of fluid flow amounts in each of the I, J, and K directions.

2. The computer-implemented method of claim 1, wherein determining the two-dimensional time independent model includes combining values of the three-dimensional time-independent model along a same dimension, including summing, for a respective (I, J) cell in the two-dimensional time-independent geocellular model, cumulative fluid flow amounts for (I, J, K) cells in the three-dimensional time-independent geocellular model having different K values for a same (I, J) pair.

3. The computer-implemented method of claim 1, wherein the determining includes assigning greater weights for time steps that are more recent.

4. The computer-implemented method of claim 1, wherein the determining includes assigning greater weights for time steps that are a better match according to a match factor a over time t using:
wherein Cu_Cell is the cumulative fluid flow amount, and wherein Z a Cell_is a respective time step for the time t.

5. The computer-implemented method of claim 1, further comprising determining, using the two-dimensional time-independent model, a sweep status of a reservoir location represented by (I, J) indexing in the two-dimensional time-independent model.

6. The computer-implemented method of claim 5, wherein determining the sweep status includes identifying a dry zone for a respective (I, J) location when a cumulative flow at the respective (I, J) location is less than pre-determined threshold epsilon value E given by: Cum cell<E.

7. The computer-implemented method of claim 5, wherein determining the sweep status includes identifying a totally swept zone for a respective (I, J) location when a cumulative flow at the respective (I, J) location is higher than pre-set threshold omega value w given by: Cum cell>w.

8. The computer-implemented method of claim 1, further comprising determining, using the two-dimensional time-independent model, one or more reservoir target locations for new wells, including identifying geosteering paths optimized to substantially avoid or target areas of higher fluid flow amounts.

9. The computer-implemented method of claim 1, further comprising determining, using the two-dimensional time-independent model, one or more geosteering paths for azimuthal direction of new wells, the geosteering paths optimized to substantially avoid or target areas of higher fluid flow amounts.

10. The computer-implemented method of claim 1, further comprising determining, using the three-dimensional time-independent model, one or more geosteering paths for inclination of new wells, the geosteering paths optimized to substantially avoid or target areas of higher fluid flow amounts.

11. A non-transitory, computer-readable medium, the computer-readable medium comprising one or more computer-readable instructions configured when executed by at least one computer to:
receive four-dimensional fluid flow data associated with a time dimension and I, J, and K dimensions, the four-dimensional fluid flow data including, for each time step of plural time steps associated with the time step dimension, a fluid flow amount for the respective time step and for a respective I, J, K cell;
determine, using the four-dimensional fluid flow data and for each of plural time steps t, a four-dimensional geocellular model having I, J, K and I dimensions and indicating, for each I, J, K, t cell, a fluid flow amount of a fluid flowing through the I, J, K cell for a respective time step t;
determine, using plural four-dimensional geocellular models, a three-dimensional time-independent model for the I, J, K cells wherein determining the three-dimensional time-independent model includes summing, for a particular I, J, K cell, the fluid flow amounts from the plural time steps; and
determine, using the three-dimensional time-independent model, a two-dimensional time-independent model that includes a cumulative fluid flow amount for each I, J cell in the respective time-independent model;
wherein the fluid flow amount for a respective cell is determined as a function of the square root of a sum of squares of fluid flow amounts in each of the I, J, and K directions.

12. The non-transitory, computer-readable medium of claim 11, wherein determining the two-dimensional time-independent model includes combining values of the three-dimensional time-independent model along a same dimension, including summing, for a respective (I, J) cell in the two-dimensional time-independent geocellular model, cumulative fluid flow amounts for (I, J, K) cells in the three-dimensional time-independent geocellular model having different K values for a same (I, J) pair.

13. A computer-implemented system comprising:
at least one hardware processor interoperably coupled with a computer memory and configured to: receive four-dimensional fluid flow data associated with a time dimension and I, J, and K dimensions, the four-dimensional fluid flow data including, for each time step of plural time steps associated with the time step dimension, a fluid flow amount for the respective time step and for a respective: I, J, K cell;
determine, using the four-dimensional fluid flow data and for each of plural time steps t, a four-dimensional geocellular model having I, J, K and t dimensions and indicating, for each I, J, K, t cell, a fluid flow amount of a fluid flowing through the I, J, K cell for a respective time step t;

determine, using plural four-dimensional geocellular models, a three-dimensional time-independent model for the I, J, K cell, wherein determining the three-dimensional time-independent model includes summing, for a particular I, J, K cell, the fluid flow amounts from the plural time steps; and determine, using the three-dimensional time-independent model, a two-dimensional time-independent model that includes a cumulative fluid flow amount for each I, J cell in the respective time-independent model;

wherein the fluid flow amount for a respective cell is determined as a function of the square root of a sum of squares of fluid flow amounts in each of the I, J, and K directions.

14. The computer-implemented system of claim 13, wherein determining the two-dimensional time-independent model includes combining values of the three-dimensional time independent model along a same dimension, including summing, for a respective (I, J) cell in the two-dimensional time-independent geocellular model, cumulative fluid flow amounts for (I, J, K) cells in the three-dimensional lime-independent geocellular model having different K values for a same (I, J) pair.

* * * * *

UNITED STATES PATENT AND TRADEMARK OFFICE
CERTIFICATE OF CORRECTION

PATENT NO.        : 10,248,743 B2
APPLICATION NO.   : 15/180832
DATED             : April 2, 2019
INVENTOR(S)       : Mohamed Bouaouaja and Ahmed Alhuthali It is certified that error appears in the above-identified patent and that said Letters Patent is hereby corrected as shown below:

In the Claims

Column 13, Line 15, Claim 1, delete "I" and insert -- t --;

Column 13, Line 22, Claim 1, delete "(low" and insert -- flow --;

Column 13, Line 27, Claim 1, delete "mode;" and insert -- model; --;

Column 13, Line 44, Claim 4, delete "4. The computer-implemented method of claim I wherein the determining includes assigning greater weights for time steps that are a better match according to a match factor a over time t using:
    wherein Cu Cell is the cumulative fluid flow amount, and wherein Z a Cell is a respective time step for the time t." and insert
-- 4. The computer-implemented method of claim 1, wherein the determining includes assigning greater weights for time steps that are a better match according to a match factor α over time t using:
$$Cum\_Cell_{flow} = \sum_t \alpha\, Cell_{flow},$$
wherein $Cum\_Cell_{flow}$ is the cumulative fluid flow amount, and
wherein $\sum_t \alpha\, Cell_{flow}$ is a respective time step for the time $t$. --;

Column 13, Line 56, Claim 6, delete "6. The computer-implemented method of claim 5, wherein determining the sweep status includes identifying a dry zone for a respective (I, J) location when a cumulative flow at the respective (I, J) location is less than pre-determined threshold epsilon value E given by: CUM cell < E." and insert
-- 6. The computer-implemented method of claim 5, wherein determining the sweep status includes identifying a dry zone for a respective (I, J) location when a cumulative flow at the respective (I, J) location is less than pre-determined threshold epsilon value ε given by:

Signed and Sealed this
Fourth Day of August, 2020

Andrei Iancu
*Director of the United States Patent and Trademark Office*

$$Cum_{Cell_{flow}} < \varepsilon.$$
--;

Column 13, Line 61, Claim 7, delete "7. The computer-implemented method of claim 5, wherein determining the sweep status includes identifying a totally swept zone for a respective (I, J) location when a cumulative flow at the respective (I, J) location is higher than pre-set threshold omega value w given by: Cum cell >w." and insert
-- 7. The computer-implemented method of claim 5, wherein determining the sweep status includes identifying a totally swept zone for a respective (I, J) location when a cumulative flow at the respective (I, J) location is higher than pre-set threshold omega value $\omega$ given by:

$$Cum_{Cell_{flow}} > \omega.$$
--;

Column 14, Line 29, Claim 11, delete "I" and insert -- t --;

Column 14, Line 64, Claim 13, delete "respective:" and insert -- respective --;

Column 15, Line 24, Claim 14, delete "lime-" and insert -- time --.